Sept. 4, 1934.  H. H. ROHRDANZ  1,972,536
FILM SPLICER
Filed May 26, 1931  2 Sheets-Sheet 1
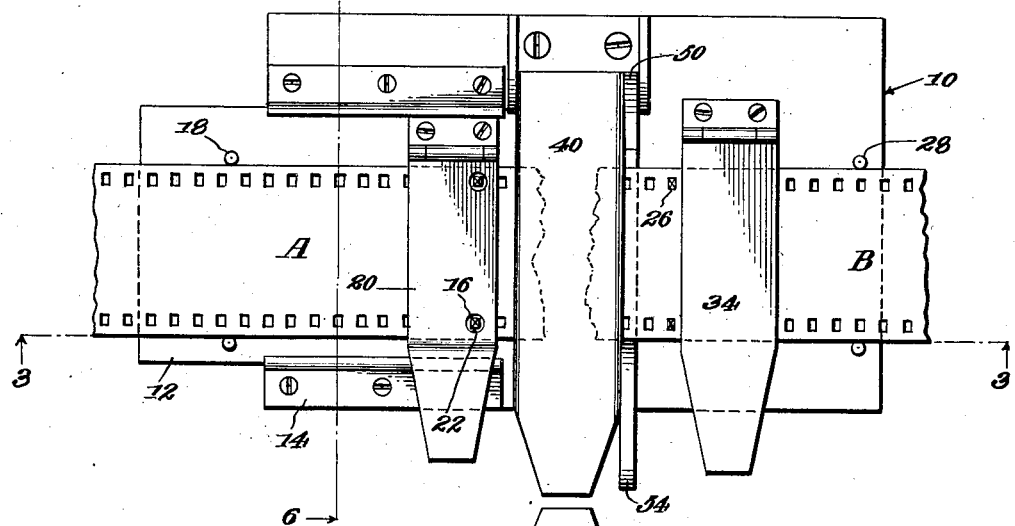
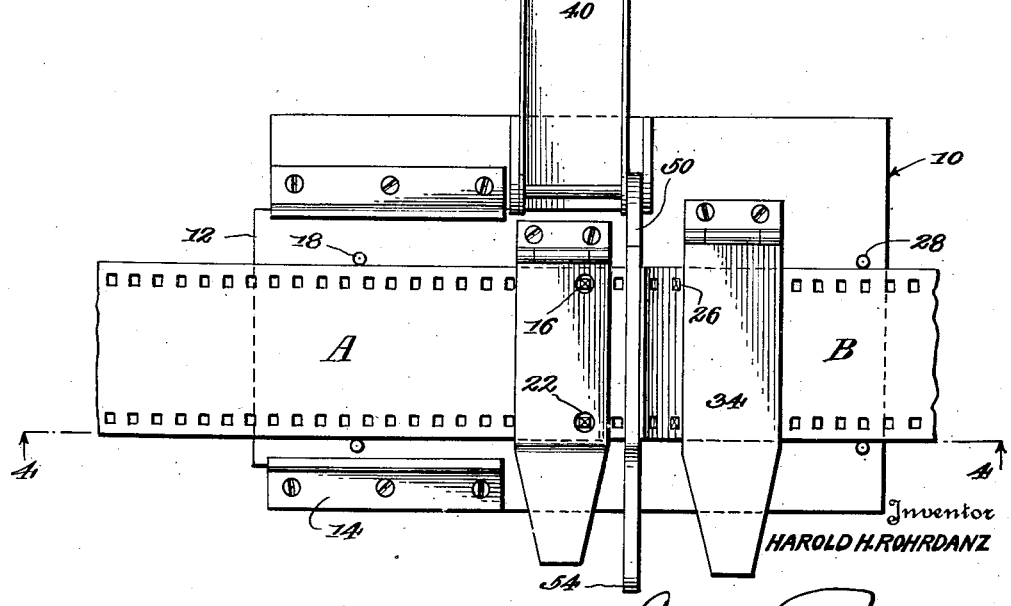
Inventor
HAROLD H. ROHRDANZ

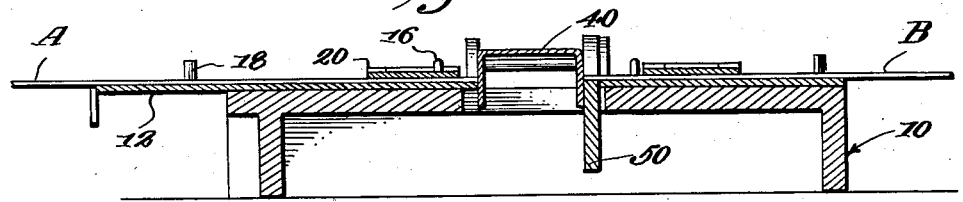
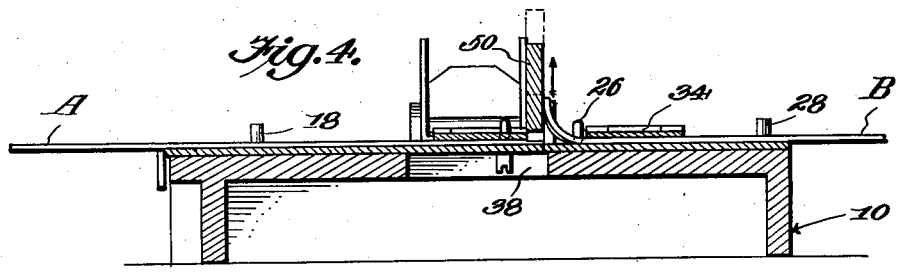
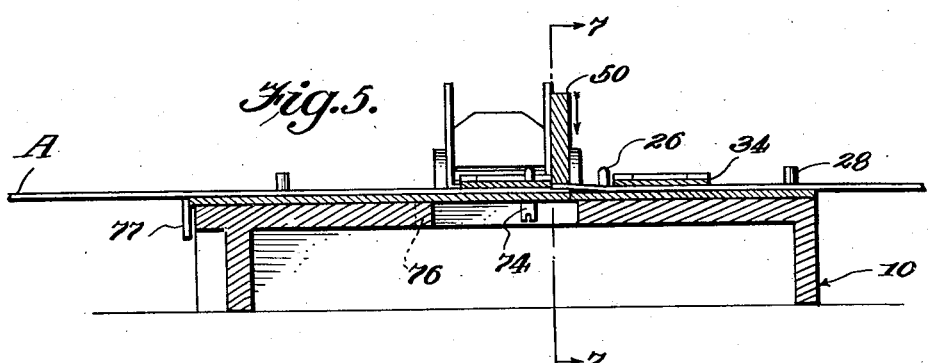
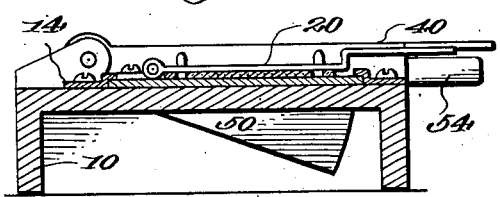
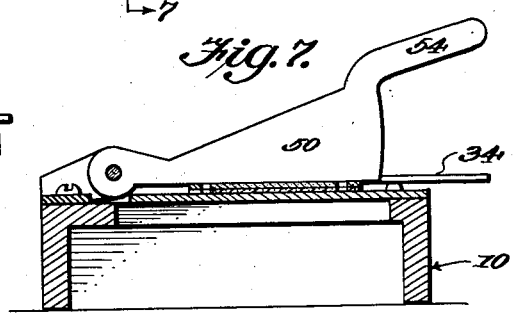

Patented Sept. 4, 1934

1,972,536

UNITED STATES PATENT OFFICE 1,972,536

FILM SPLICER

Harold H. Rohrdanz, Inglewood, Calif.

Application May 26, 1931, Serial No. 540,133

7 Claims. (Cl. 154—42)

This invention relates to splicing devices especially adapted for use in connection with motion picture films.

Briefly stated, one of the objects of the invention is to provide a splicing machine for films in which the proper attachment or connection of the severed portions of a film to the device may be immediately followed by the various splicing operations such, for example, as cutting, scraping, cementing and overlapping without changing the position of the sections of the film with respect to those parts of the device to which the same were originally attached with the result that the manual handling of the film is reduced as compared to other splicing devices on the market, and the time required for the slicing operation diminished.

The invention will also be found to contemplate a splicing device for films having a novel form of arm which, during the actual cutting operation of the severed ends of the film will serve as a portion of the support for the film and which when raised after the cutting operation will lift one of the sharply cut ends of the film so that the same may be brought into overlapping relation with the other sharply cut end of the film, and which finally will function as a pressure device to bring about uniform pressure contact of the overlapped and cemented ends of the film.

A further object of the invention is to provide a film splicing device in which the various operations necessary to splice the severed ends of a film are more or less self-suggestive to adapt the device to use by those having no special skill in such matters, although, as will appear, the device is equally adaptable for professional use.

Other objects and advantages will be apparent during the course of the following description.

In the accompanying drawings, forming a part of this application, and in which like numerals are employed to designate like parts throughout the same,—

Figure 1 is a plan view of the improved splicing device, the view illustrating the means by which the ragged ends of a film may be simultaneously removed to form sharply cut ends that are subsequently united.

Figure 2 is a plan view illustrating the manner in which one of the sharply severed end portions may be raised to be brought into overlapping relation to the other sharply cut portion of the film to which it is to be spliced, this view also illustrating the means by which the sharply cut portions of the film may be brought together without disturbing the attachment of the film to those parts of the device to which it was originally connected.

Figure 3 is a longitudinal sectional view taken on line 3—3 of Figure 1.

Figure 4 is a longitudinal sectional view taken on line 4—4 of Figure 2.

Figure 5 is a longitudinal sectional view through the device illustrating the manner in which an arm embodied in the invention may be employed to bring the newly cut ends of the film into uniform pressure contact to provide the desired union between these parts.

Figure 6 is a transverse sectional view taken on line 6—6 of Figure 1.

Figure 7 is a transverse sectional view taken on line 7—7 of Figure 5.

Figure 8 is a side elevation of a scraping device embodied in the invention.

In the drawings, wherein for the purpose of illustration is shown a preferred embodiment of the invention, the numeral 10 designates a base which may be made from metal, wood or any other material found suitable for the purpose, and which may be of rectangular form.

The film sections to be spliced are designated by the numerals A and B the section A being detachably connected to what might be said to be a film carriage 12 while the section B is detachably connected to the upper surface of the base. More specifically, the film carriage 12 is in the form of a flat plate slidably mounted on the base 10 and having the longitudinal edge portions thereof overlapped by guide flanges 14 through the medium of which the carriage is caused to move in a straight path.

In carrying out the invention, the film carriage 12 is provided with a pair of upstanding pins 16 adapted to be extended through the openings in the edge portions of the film section A. What might be said to be the outer portion of the film carriage 12 is provided on the upper surface thereof with a pair of upstanding posts 18 between which the film section A is positioned so that these posts are caused to cooperate with the pins 16 in holding the section A truly in line on the carriage.

Figures 1 and 6 clearly illustrate that a retainer plate 20 is horizontally hinged at one end thereof to one edge portion of the carriage 12 and is adapted to be brought down flatly into contact with the adjacent portion of the film section A to hold the same firmly in position. It will be seen that the retainer plate 20 is provided with a pair of openings 22 adapted to freely receive the pins 16. The free end portion of the plate 20 is shown to be offset upwardly and extended beyond the base to form a convenient means by which the same may be manually engaged.

Figures 1 and 2 illustrate that a pair of pins 26 are extended upwardly from the base 10 and are adapted to be passed through the openings in the longitudinal edge portion of the film section B to secure the section B in a predetermined position on the base and in line with the film section A. A pair of posts 28 secured to the base 10 adjacent one end thereof is adapted to engage opposite edges of the film section B to cooperate with the pin 26 in holding the section B accurately in line on the base.

A retainer plate 34 is horizontally hinged at one end to the base and is adapted to be brought down flatly into contact with the upper surface of the film section B to hold the section against accidental curling on the base, although as will hereinafter appear, the retainer plate 34 is spaced a sufficient distance from the inner end of the section B to allow the same to be intentionally lifted, preparatory to the actual overlapping of the ends to be spliced.

At this point attention is directed to the fact that once the film sections A and B have been attached to the device the various operations such, for example, as cutting, scraping, cementing and overlapping may be performed without changing the positions of the film sections A and B with respect to those parts of the device to which the same were attached originally. That is to say, the film section A will remain attached to the carriage 12 through the various operations necessary to splice the film while the section B will remain connected to the pins 26 through the entire procedure. This greatly simplifies the splicing operation since the manual handling of the sections of the film is reduced to a minimum.

The herein disclosed splicer contemplates the simultaneous cutting of the ragged ends of the film sections A and B and to provide for this the sections A and B are arranged so that the ragged ends to be removed by cutting are extended partly over a transverse slot 38 in the intermediate portion of the base 10. Such an arrangement of the ragged ends of the sections A and B is illustrated in Figures 1 and 3. It might be explained that the ragged end of the section A is extended over or partly across the opening 38 by adjustment of the carriage 12 it being understood that when the section A is attached to the film carriage 12 the ragged end portion thereof projects beyond the inner end of the carriage. Also in connecting the section B to the base 10 the ragged end portion thereof is extended partly across the opening 38.

With the ragged end portions of the sections A and B thus extended partly across the opening 38 the cutter 40 is brought into operation to simultaneously sever the ragged ends of the film and form sharp ends which are subsequently overlapped and cemented as will be described. The cutter 40 is in the nature of an elongated metallic or other body horizontally hinged to the base and having the longitudinal edge portions thereof extended angularly to form spaced parallel cutter blades adapted to be brought into cutting engagement with the adjacent ragged end portions of the film sections. In other words, the cutter 40 is U-shaped in cross section and the sides are formed with cutting edges by which the ragged end portions of the sections A and B are sharply cut for subsequent splicing.

Figures 1 and 2 illustrate that the central longitudinal portion of the cutter 40 is extended at the free end of the cutter beyond the cutting blades to form an operating handle which, when the blade is advanced will extend beyond the side of the base.

The numeral 50 designates what might be described as a combined supporting, lifting and pressure arm shown in Figures 1, 2 and 7 to be horizontally hinged at the rear end thereof to the base and adapted to be extended into or through the opening 38 so that the outer straight edge intermediate the ends thereof will be flush with the upper surface of the base 10 to cooperate therewith in forming a supporting surface for the film section B. More specifically, when the arm 50 is in the lowered position suggested in Figures 1 and 3, the outer edge of the arm will be flush with the upper surface of the base 10 and will be engaged by the end portion of the film section B. It is important to observe that the arm 50 has an offset terminal portion or finger 54 adapted to rest on one side of the base to hold the outer edge of the arm flush with the upper surface of the base. Of course, preparatory to the actual cutting of the ragged ends of the film sections A and B, the arm 50 is brought into the lowered position suggested in Figures 1 and 3, so that during the cutting operation the arm will form a portion of the supporting surface for the film section B.

With the ends of the sections A and B positioned as shown in Figure 1, the cutter 40 is swung down into cutting engagement with the ragged end portions of the film sections and the severed portions are allowed to drop freely through the opening 38 after which the cutter 40 is swung back to the inoperative position suggested in Figure 2.

It is important to observe that the sharply severed end of the section A is extended a predetermined distance beyond what might be said to be the inner edge of the retaining plate 20 thereby leaving the predetermined portion of the sharply severed section of the film section A exposed to be scraped as a preliminary to the application of the cement by which the sections of the film are united. For the scraping operation, a scraper 60 shown in Figure 8 may be employed and is shown to have a scraping edge 62 having a width substantially co-extensive with the width of the exposed portion of the section A, so that by drawing the scraping edge 62 across the exposed portion of the section A the emulsion may be removed therefrom.

The removal of the emulsion from a portion of the film may be followed by the application of cement after which the carriage 12 is advanced with the left hand and the arm 50 raised with the right hand so as to bring about an overlapping of the portions of the film to be united. By thus raising the arm 50 the portion of the film B immediately above is raised in the manner suggested in Figure 4 during which the scraped and cement bearing portion of the film section A is advanced to a position beneath the raised section of the film B with the result that continued upward movement of the arm 50 will release the section B and allow the same to come into overlapping relation with the adjacent portion of the section A. With the sections A and B thus overlapped the arm 50 is brought down into pressure contact with the same to establish the uniform pressure contact necessary to affect the proper splicing of the sections A and B.

The arm 50 has the lower edge thereof flat for uniform pressure engagement with the spliced portions of the film and need remain in engagement with the spliced portions of the film only long enough to assure the permanent union of these parts.

It will be seen with reference to Figure 7, that the arm 50 is uniformly increased in width from a point adjacent the hinged end thereof to a point adjacent the outer portion thereof so that when the arm is lowered the outer edge of the arm will be flush with the upper surface of the base while the lower or inner edge of the arm may have uniform pressure contact with the overlapped portions of the film during the final splicing step.

As shown in Figures 4 and 5, the under side of the carriage 12 is provided with a depending stop element 74 movable into a notch or recess 76 in the base so that the outward movement of the carriage is limited.

Figure 5 also illustrates that the outer end of the carriage is provided with a depending lug or lip 77 providing a convenient means by which the carriage may be manually engaged.

By way of summary it might be pointed out that to splice a film through the use of this invention, the sections A and B of the film are attached to the device in the manner illustrated in Figure 1, with the section B anchored to the pins 26 while the section A is anchored to the pins 16 of the slidable carriage 12. Of course, the sections A and B are caused to protrude beyond those parts of the device to which the same are anchored so that the portions to be severed are extended partly across the opening 38.

With the ragged ends of the film sections thus extended partly across the openings 38 the cutter 40 is swung down to the position shown in Figure 3 to sharply cut the sections of the film, after which the cutter is returned to the inoperative position shown in Figure 2.

Following the first step of sharply cutting the ends of the film, that portion of the film section A that is extended beyond the inner edge of the plate 16 is scraped and is subsequently provided with a layer of cement. Following this, the carriage 12 is moved inward simultaneously with the upward swinging of the arm 50 so that the cement bearing portion of the film is brought into position beneath the inner end portion of the film section B. As previously described, the upward swinging of the arm 50 is accompanied by the elevation of the adjacent portion of the film section B and in the subsequent release of this section of the film, so that the same may be brought down into contact with the cement bearing portion of the film. The final function of the arm 50 is to have pressure contact with the overlapped portions of the film to complete the splicing operation.

It will be apparent from the foregoing description that the arm 50 functions first, as a supporting means for a portion of the film; second as a lifting element for the inner portion of one section of the film; and third, as a pressure medium which acts to bring about uniform pressure engagement of the overlapped portions of the film.

A film splicer constructed in accordance with this invention is simple to operate and may be used to advantage in connection with films of various sizes, the various steps incident to the splicing of a film are more or less self-suggestive and it is believed to be clear that the device is adapted for use by amateurs as well as by professionals.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:—

1. In a film splicer, a base, means mounted on the base to anchor a section of a film thereto, and a carriage slidable on the base and having means by which another section of a film may be anchored thereto, and a cutter hinged to the base and being provided with spaced parallel blades to simultaneously cut said sections of the film, and an arm hinged to the base and having means to raise a portion of the one section of the film and to subsequently engage that portion of the section of the film with the other section of the film.

2. In a film splicer, a base having an anchoring means for a section of a film, a carriage slidable on the base and being provided with means by which another section of a film may be anchored thereto, a cutter to simultaneously cut the first and second named sections of the film, an arm movably connected to the base and being provided with means to support a portion of one of said sections of the film and to subsequently raise that portion of the film so that the same may have overlapping contact with the other section of the film, said arm also being provided with means by which uniform pressure contact may be applied to the overlapped portions of the film.

3. In a film splicer, a base having an anchoring means for a section of a film, a carriage slidable on the base and being provided with means by which another section of a film may be anchored thereto, a cutter to simultaneously cut the first and second named sections of the film, an arm movably connected to the base and being provided with means to support a portion of one of said sections of the film and to subsequently raise that portion of the film so that the same may have overlapping contact with the other section of the film, said arm also being provided with means by which uniform pressure contact may be applied to the overlapped portions of the film, and means limiting sliding movement of said carriage.

4. In a film splicer, a base having an opening, a cutter hinged to the base and being provided with cutting blades movable into said opening, means associated with said base for anchoring a section of a film to cause one end of the same to extend partly across said opening for engagement by one of said blades, a carriage slidably associated with said base and having means whereby a second section of a film may be anchored thereto with one end thereof extended partly across said opening for engagement by one of said blades, an arm hinged to said base and adapted to extend into said opening to position the outer edge thereof substantially flush with the surface of said base to cooperate with the base in forming a support for one section of said film, said arm being removable from said opening to lift the adjacent portion of the film to allow the carriage supported film to move beneath the same.

5. In a film splicer, a base having an opening, a cutter hinged to the base and being provided with cutting blades movable into said opening, means associated with said base for anchoring a section of a film to cause one end of the same to extend partly across said opening for engagement by one of said blades, a carriage slidably associated with said base and having means whereby a second section of a film may be anchored thereto with one end thereof extended partly across said opening for engagement by one of said blades, an arm hinged to said base and adapted to extend into said opening to position the outer edge thereof substantially flush with the surface of said base to cooperate with the base in forming a support for one section of said film, said arm being removable from said opening to lift the adjacent portion of the film to allow the carriage supported film to move beneath the same, and means limiting sliding motion of said carriage.

6. In a device for splicing films, a base having an opening, an arm hinged to the base and adapted to be extended into said opening, and being provided with means to engage the base and thereby hold a portion of the arm flush with the upper surface of the base and immediately contiguous thereto to form a film support, said arm being removable from said opening to lift the adjacent portion of the film so that another portion of a film may be positioned beneath the same.

7. In a device for splicing films, a base having an opening, an arm hinged to the base and adapted to be extended into said opening, and being provided with means to engage the base and thereby hold a portion of the arm flush with the upper surface of the base and immediately contiguous thereto to form a film support, said arm being removable from said opening to lift the adjacent portion of the film, so that another portion of a film may be positioned beneath the same, and a film carriage movably associated with the base and having means by which the same may position a portion of a film beneath the lifted portion of the film.

HAROLD H. ROHRDANZ.